(12) United States Patent
Smith

(10) Patent No.: US 9,453,936 B2
(45) Date of Patent: Sep. 27, 2016

(54) BODY SCANNER WITH IMPROVED X-RAY TRANSMISSION IMAGING

(76) Inventor: Steven Winn Smith, Poway, CA (US)

(*) Notice: Subject to any disclaimer, the term of this patent is extended or adjusted under 35 U.S.C. 154(b) by 878 days.

(21) Appl. No.: 13/154,226

(22) Filed: Jun. 6, 2011

(65) Prior Publication Data

US 2012/0307968 A1    Dec. 6, 2012

(51) Int. Cl.
*G01N 23/04* (2006.01)
*G01V 5/00* (2006.01)

(52) U.S. Cl.
CPC ........... *G01V 5/0025* (2013.01); *G01V 5/0016* (2013.01)

(58) Field of Classification Search
CPC .............. G01N 23/04; G01N 23/203; G01N 2223/643
USPC .......................................................... 378/57
See application file for complete search history.

(56) References Cited

U.S. PATENT DOCUMENTS

| | | | | |
|---|---|---|---|---|
| 6,094,472 A * | 7/2000 | Smith | ................... | G01N 23/203 378/86 |
| 2009/0116617 A1* | 5/2009 | Mastronardi | ........ | G01N 23/201 378/87 |
| 2011/0096901 A1* | 4/2011 | Kotowski et al. | ............... | 378/57 |
| 2011/0129063 A1* | 6/2011 | Bendahan | .............. | G01V 3/104 378/57 |

* cited by examiner

*Primary Examiner* — Hoon Song
(74) *Attorney, Agent, or Firm* — Garrett James O'Sullivan; Timothy Marc Shropshire; Mu Patents

(57) ABSTRACT

The inventive body scanner is used to screen persons entering a security controlled area for the presence of security threats hidden under the clothing, such as guns, knifes, explosives and contraband. The Invention is an improvement on prior art body scanners that operate primarily by acquiring backscatter x-ray images, but only acquire transmission images over a limited part of the person's body. These prior art systems provide x-ray sources on the anterior and posterior sides of the person being screened, and x-ray sensitive detectors on the sides of these x-ray sources. While sufficient for backscatter imaging, the gaps between these detectors results in blind areas in the transmission images, resulting in lower ability to detect security threats hidden under the clothing. The present Invention overcomes these limitations of the prior art by providing x-ray sensitive detector on the outside of the x-ray sources. That is, the pair of x-ray sources are located within the pair of x-ray detectors, and the person being screened is located within the pair of x-ray sources. In conjunction with this imaging geometry, spatial offsets in the location of the x-ray sources provide effectively full transmission coverage for transmission imaging.

11 Claims, 12 Drawing Sheets

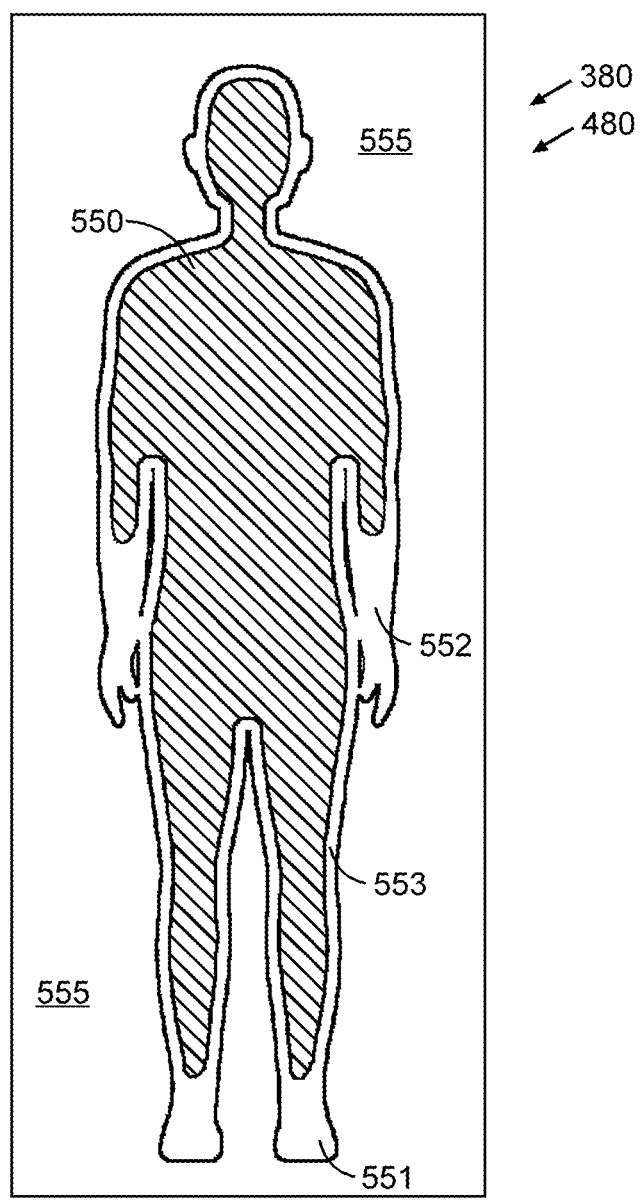

BODY SCANNER WITH IMPROVED X-RAY TRANSMISSION IMAGING

BACKGROUND OF THE INVENTION

This invention relates to the radiant energy imaging of humans to detect weapons, explosives, contraband, and other security threats hidden under the clothing.

Criminals and terrorists frequently conceal security threats under their clothing, such as handguns, knifes, explosives and illicit drugs. These security threats must be detected on persons entering security controlled areas, such as prisons, airports, government buildings, nuclear power plants, military bases, and the like. Searching individuals by hand is time consuming, often ineffective, and objectionable to both the person being screened and the security officer performing the screening. Electronic imaging systems became commercially available in the 1990s to facilitate this screening process. These include the model SECURE 1000, sold by Rapiscan Security Products; model SmartCheck, sold by American Science and Engineering; and model ProVision, sold by L3 Communications. These electronic imaging systems are commonly referred to as "body scanners."

Body scanners operate by exposing the person being screened to radiant energy, such as millimeter waves or x-rays. A portion of the radiant energy interacts with the person, their clothing, and any concealed objects they may be carrying. This interaction modulates the radiant energy that is reflected from, scattered by, or transmitted through the person. This reflected, scattered or transmitted radiant energy is collected by sensitive detectors, and the resulting electronic signals are routed to a digital computer. Software operating in the digital computer converts the electronic signals into digitally represented images of the person's body. In these images the clothing is essentially transparent, allowing the security officer to visualize any objects that are concealed under the clothing.

Prior art body scanners are capable of detecting a wide range of objects concealed under the clothing. However, the human body is complex in shape, and the type of clothing worn by people is diverse and unpredictable. This results in areas of the body where prior art body scanners are ineffective in detecting objects. Of particular concern are the sides of the body and the shoes, where certain types of threats are likely to be missed by prior art systems. Further, prior art body scanners are physically large, and therefore difficult to incorporate into space-limited security checkpoints, such as airports.

FIG. 1 depicts the operation of one type of prior art x-ray body scanner, such as described in U.S. Pat. Nos. Re. 28,544; 5,181,234; and 6,665,373. An x-ray source 10 produces an x-ray beam 11 that is directed at the examined person 12. The cross-section of the x-ray beam 11 is typically about 6 mm×6 mm where it strikes the examined person 12. One of three outcomes will be experienced by each individual x-ray in the x-ray beam 11. First, the x-ray may interact with the body tissue through the photoelectric effect and be annihilated. Second, the x-ray may interact with the body tissue through Compton scattering, which alters its direction of propagation. X-rays that are scattered in the forward direction, that is, into the body, are not useful and are ignored. However, x-rays that scatter in the reverse or backward direction, called backscatter x-rays 20, carry useful information. Third, an individual x-ray may pass completely through the examined person 12, or pass around the examined person 12, without interacting. These are called transmitted x-rays 15, and also carry useful information.

The backscatter x-rays 20 are detected by backscatter detector 30 to produce an electronic backscatter signal 35. Likewise, the transmitted x-rays are detected by vertical transmission detector 18 and floor transmission detector 19, thereby generating an electronic transmission signal 36. Both the backscatter signal 35 and the transmission signal 36 are routed into digital computer 60. As thus described, the instantaneous value of the backscatter signal 35 is a measurement of the backscattering properties of the examined person 12 at the location on the body where the x-ray beam 11 is incident. In a similar fashion, the instantaneous value of the transmission signal 36 is a measurement of the transmission properties of the examined person 12 at the location on the body where the x-ray beam 11 transits through the body. These instantaneous values of the signals are recorded by digital computer 60. Subsequent measurements are made on all other locations on the body of the examined person 12 by redirecting the x-ray beam 11 to those locations, a technique known in the art as a "flying spot." As disclosed in the above referenced U.S. patents, this flying spot scanning may be accomplished by a rotating chopper assembly for sweeping the x-ray beam in a horizontal arc, in conjunction with a vertical displacement or rotation of the x-ray source 10. These apparatus and methods for steering the x-ray beam 11 are well known to those skilled in the art. A control signal 40 synchronizes the data collection of digital computer 60, allowing it to format the measurements into electronic images. Specifically, the series of measurements appearing in the backscatter signal 35 is formatted into a backscatter image 50. Likewise, the series of measurements appearing in the transmission signal 36 is formatted into a transmission image 70. Accordingly, the backscatter image 50 is representative of the modulation produced by x-ray beam 11 being backscattered by the examined person 12. Similarly, the transmission image 70 is representative of the modulation produced by the x-ray beam 11 being transmitted through the examined person 12.

As thus described, the prior art body scanner depicted in FIG. 1 acquires a backscatter image 50 and a transmission image 70 from a single viewpoint on the anterior or front side of the examined person. That is, the depicted body scanner would be said to be a "single-view, dual mode" system, acquiring a front-backscatter image and a front-transmission image. An important aspect of the prior art body scanner depicted in FIG. 1, as it pertains to the present Invention, is that the x-ray source 10 is physically positioned between and/or behind the x-ray detectors 30. An attribute of this prior art embodiment is that both the transmission image 70 and the backscatter image 50 have a complete field-of-view. That is, the entire examined person 12 appears in the images 50 70 from head to toe, with no regions missing from the image acquisition. In addition, this embodiment operates with stationary detectors 18 19, thereby avoiding the problem of moving sensitive electronics during the image acquisition.

A limitation of the prior art embodiment of FIG. 1 is that the examined person 12 must turn their body to obtain a rear scan. Another limitation of this embodiment is that the shoes are examined with the same apparatus that scans the whole body. That is, the shoes are portrayed in the same backscatter image 50 and transmission image 70 as the front of the body, and not otherwise examined. However, these images of the prior art are not sufficient to detect security threats in the shoes for two important reasons. First, the backscatter image 50 is only a view from an angle generally above and in front of the shoes, and cannot visualize concealed objects hidden underneath the foot, or concealed within the sole and heal of the shoes. Second, the spatial resolution of the transmission x-ray image 70 is too low to adequately inspect the shoes. As known in the art, the spatial resolution of a flying spot imaging system is determined by the cross-section of the x-ray beam 11 where it strikes the examined person 12. For prior art body scanners this is typically about 6 mm, which is insufficient to resolve the bones in the feet of the examined person 12. In turn, the insufficiently resolved bones in the feet produce an image clutter that drastically interferes with the visualization of concealed objects. Put in other words, the task of the security operator viewing the image is to discriminate between the normal anatomy of the feet and non-anatomic objects contained in the shoes. If the operator cannot clearly identify the complex pattern of bones in the feet, they cannot distinguish these bones from hidden objects.

These limitations and attributes of the prior art depicted in FIG. 1 can be compared with a second embodiment of the prior art. FIG. 2 is a depiction of another prior art body scanner geometry, in accordance with U.S. Patent Application 2009/0116617. This consists of a front scanner 8 and a rear scanner 7, which are essentially identical in physical structure. This front-back symmetry allows both backscatter and transmission images to be acquired from both the anterior and posterior viewpoints. For the posterior or rear scanning cycle, rear carriage assembly 80 emits an x-ray beam 11 horizontally, striking examined person 12. As previously explained, a portion of the x-ray beam 11 will become backscatter x-rays 20, and a portion will become transmitted x-rays 15. The backscatter x-rays 20 are detected by a rear-upper detector 31 and a rear-lower detector 32, and used to create a rear-backscatter image. The transmitted x-rays 15 are detected by a front-upper detector 33, and used to create a rear-transmission image. As known in the art and disclosed in the above referenced document, the x-ray beam 11 is scanned horizontally in an arc to acquire one line in both the backscatter and transmission images. To complete the vertical component of the raster scan, rear carriage 80 and front carriage 81 move vertically in synchronization, maintaining alignment of the transmitted x-rays 15 with the front-upper detector 33.

Because the front scanner 8 and the rear scanner 7 are identical in physical structure, the above operation can be repeated in a mirror image fashion. That is, a front-backscatter image is acquired by emitting an x-ray beam from the front carriage 81, and detecting backscatter x-rays with front-upper detector 33 and front-lower detector 34. Likewise, a front-transmission image is simultaneously acquired by detecting transmitted x-rays with upper-rear detector 31. Accordingly, the prior art body scanner depicted in FIG. 2 acquires both transmission and backscatter images from both the front (anterior to the examined person 12) and rear (posterior to the examined person 12), and therefore would generally be called a "dual-view dual mode" system. However, this prior art system does not fully meet this classification, since transmission images from both the front and rear cannot be obtained of the lower legs and feet. The lowermost location on the examined person 12 that will appear in the transmission image is limited by the physical size of the front carriage 80 and the rear carriage 81. That is, when the carriages 80 81 are in their lowermost position, their respective x-ray beams will be some distance above the ground. Tilting the x-ray beams toward the ground allows for acquisition of complete backscatter images, including the feet. However, no detector is present that is capable of detecting x-rays that are transmitted through the lower legs and feet. In a practical embodiment the lower 12" to 18" of the legs will not appear in the images. As before, an important aspect of the prior art body scanner depicted in FIG. 2, as it pertains to the present Invention, is that the x-ray source is physically positioned between and/or behind the x-ray detectors.

As thus described, prior art body scanners are limited in their ability to search persons entering security controlled areas by the number of images they can acquire of each person. At most, prior art systems acquire dual-view dual-mode images, with the transmission images being only partial images. This results in blind areas in detection on the body of the person being screened. Further, the prior art apparatus has a physically large footprint, and therefore is not able to be installed in security checkpoints where floor space is limited. For instance, the apparatus in FIG. 2 is approximately nine feet wide, with three feet for the width of the rear scanner 7, three feet for the positioning of the examined person 12, and three feet for the width of the front scanner 8. Further, prior art body scanners can scan a person without the person turning their body, as depicted in FIG. 2, or they can create complete transmission images of the entire person's body, as depicted in FIG. 1. However, no prior art body scanner can do both in a single apparatus.

BRIEF SUMMARY OF THE INVENTION

The present Invention overcomes these limitations of the prior art by providing an apparatus and method capable of acquiring improved digital images of the person being screened. In one embodiment this is achieved by viewing the person with radiant energy from three directions: from the person's anterior side (i.e., the front), from the person's posterior side (i.e., the rear), and from beneath the person's feet in the standing position. Further, the present Invention views the person with two modalities of radiant energy modulation: backscatter and transmission. These tri-view and dual-mode features of the present invention, operating separately or preferably in combination, eliminate the critical blind areas of prior art systems. In one preferred embodiment the present Invention acquires six distinct and complete x-ray images of the person being examined: front-backscatter, rear-backscatter, feet-backscatter, front-transmission, rear-transmission, and feet-transmission. Further, the present Invention achieves this improvement while reducing the physical size of the apparatus compared with the prior art.

It is therefore the goal of the present Invention to provide an improved method and apparatus for detecting security threats concealed under the clothing of a person entering a security controlled area. Another goal of the invention is to provide additional images of the person being examined to eliminate blind spots where security threats may be concealed. Yet another goal is to provide complete images of the entire body, thereby further eliminating blind spots. Still another goal is to more throughly inspect the shoes worn by the person. A further goal is to provide a physically compact apparatus that occupies less floor space in the security checkpoint. Yet another goal is to obtain anterior and posterior images in rapid succession, with a complete field of view on both the backscatter and transmission images. Still another goal is to provide a body scanner with stationary detectors, while not requiring the person to turn their body during the examination.

BRIEF DESCRIPTION OF THE DRAWINGS

FIG. 5 is a depiction in accordance with the transmission image of the present invention.

DETAILED DESCRIPTION OF THE INVENTION

Figure 3:
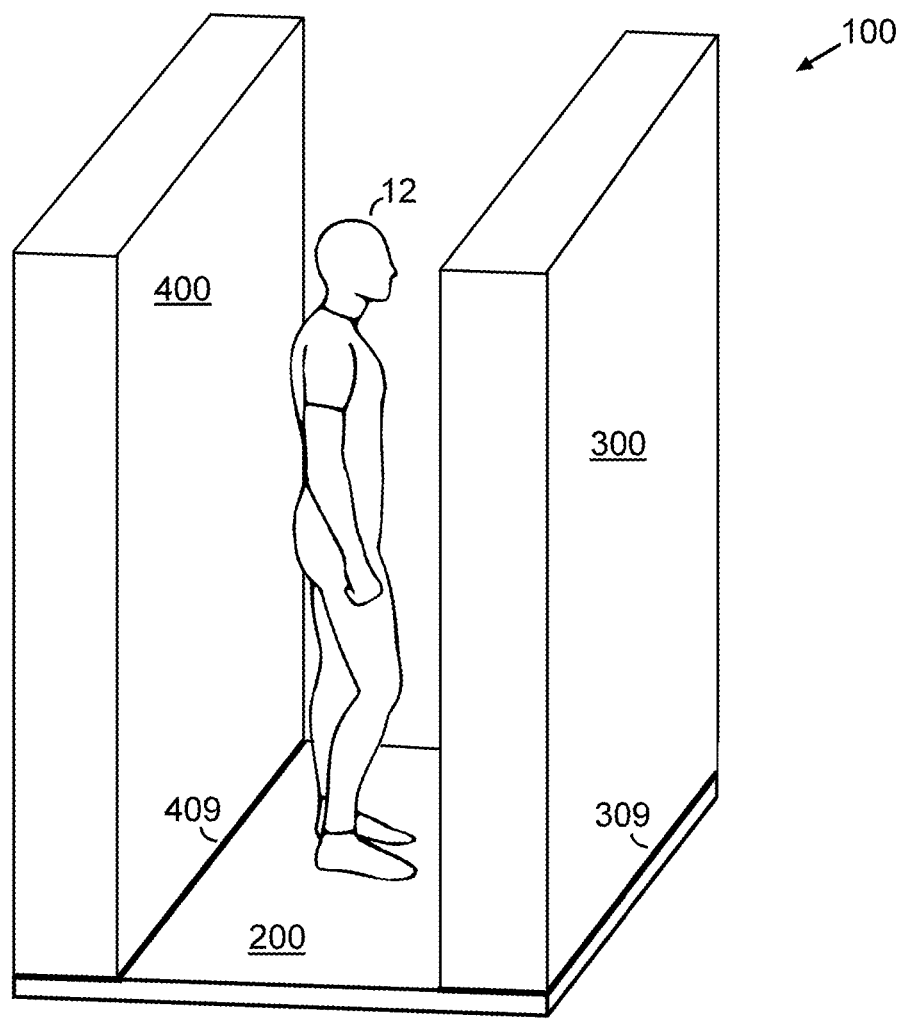
FIG. 3 is a depiction in accordance with the physical structure of the present Invention.

FIG. 3 depicts the overall physical structure of a preferred embodiment of the present Invention. The body scanner 100 generally comprises a base assembly 200 measuring approximately 60" by 60" by 4"; a front assembly 300 measuring approximately 13" by 60" by 96" inches; and a rear assembly 400 measuring approximately 13" by 60" by 96". The examined person 12 stands on the base assembly 200 centered between the front assembly 300 and the rear assembly 400. The front assembly 300 is joined with the base assembly 200 by front connection 309. Likewise, the rear assembly 400 is joined with the base assembly 200 by rear connection 409. The front and rear connections 309 409 are preferably removable fasteners that can be connected or disconnected at will, such as bolts, clamps and tie downs known in the art. This facilitates movement of the body scanner 100 from one location to another by disassembly into three easily transported assemblies 200 300 400.

Figure 4A:
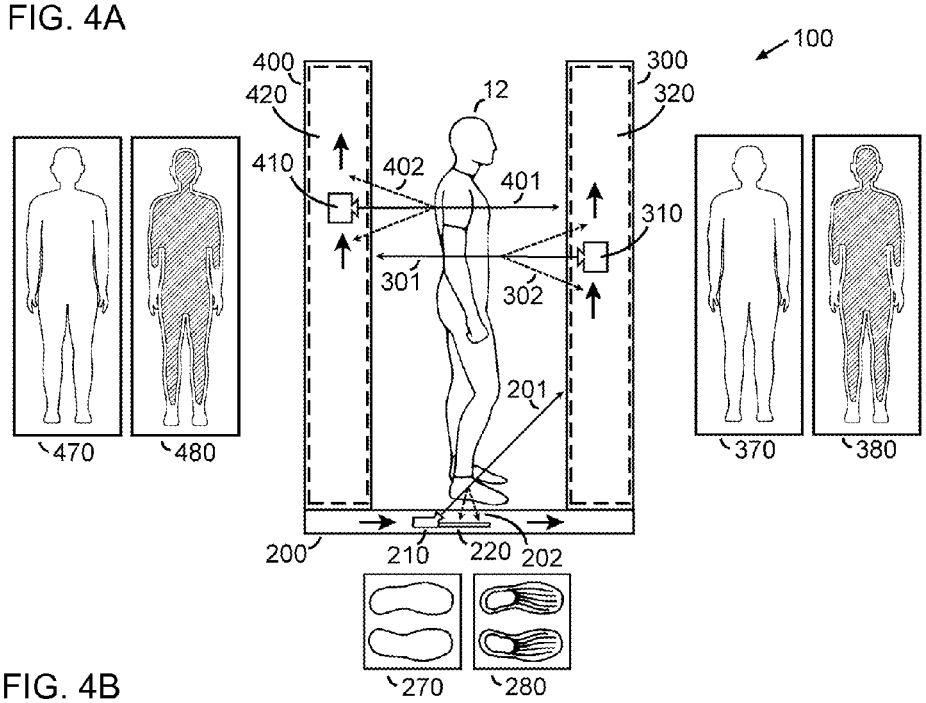
FIG. 4A and FIG. 4B are depictions in accordance with the present Invention.
Figure 4B:
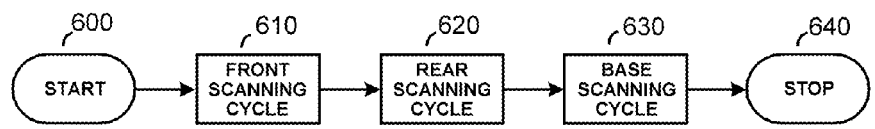

FIG. 4A and FIG. 4B are a more detailed depiction of a preferred embodiment of body scanner 100. Front assembly 300 comprises a front x-ray detector 320, which is stationary, and a front x-ray source 310, which translates in the vertical direction during the front scanning cycle 610. Likewise, rear assembly 400 comprises a rear x-ray detector 420, which is stationary, and a rear x-ray source 410, which translates in the vertical direction during the rear scanning cycle 620. The base assembly 200 comprises a base x-ray detector 220 and a base x-ray source 210, both of which translate horizontally during the base scanning cycle 630.

As depicted in FIG. 4B, the screening of the examined person 12 comprises three scanning cycles executed sequentially. In one embodiment the sequence starts 600 by executing a front scanning cycle 610. At the beginning of the front scanning cycle 610 the front x-ray source 310 is at its lowermost position within the front assembly 300. During the scanning cycle 610, lasting about 3 seconds in a preferred embodiment, the front x-ray source 310 translates from its lowermost to its uppermost position within the front assembly 300. At the beginning of this motion the front x-ray source 310 starts emission of a front x-ray beam 301.

As previously described and known in the art, the front x-ray beam 301 is a flying spot configuration. That is, front x-ray beam 301 is a narrow beam of x-rays that are swept in a horizontal arc. A portion of the front x-ray beam 301 will interact with the body of examined person 12 and become the front-backscatter x-rays 302. These front-backscatter x-rays are detected by front x-ray detector 320 and the information used to create the front-backscatter image 370. A portion of front x-ray beam 301 is transmitted through examined person 12 where it is detected by rear detector 420, and the information used to create the front transmission image 380. The rear scanning cycle 620 begins at the completion of the front-scanning cycle 610 and is essentially a mirror image. That is, the rear x-ray source 410 moves from its lowermost to uppermost position within rear assembly 400 while emitting a rear x-ray beam 401. Rear-backscatter x-rays 402 from the rear x-ray beam 401 are detected by rear detector 420 and the information used to create rear-backscatter image 470. Likewise, the portion of the rear x-ray beam 401 that is transmitted through the examined person 12 strikes the front x-ray detector 320, and is used to create the rear-transmission image 480.

The base scanning cycle 630 begins at the completion of the rear scanning cycle 620. During the base scanning cycle 630 the base x-ray source 210 moves horizontally within the base assembly 200 from a position behind the examined person 12 to a position in front of the examined person 12. Concurrently, the base x-ray source 210 emits a base x-ray beam 201, upward through the shoes and feet of the examined person 12, at an angle of approximately 45 degrees with the vertical. Base-backscatter x-rays 202, which are scattered from the base x-ray beam 201 by the shoe and/or foot of examined person 12, are detected by base detector 220, and the information used to create the base backscatter image 270. The portion of the base x-ray beam 201 that is transmitted through the shoes and feet of the examined person 12 is detected by the front detector 320, and the information used to create base transmission image 280. The scanning sequence ends 640 at the completion of the base scanning cycle 630.

Figure 1:
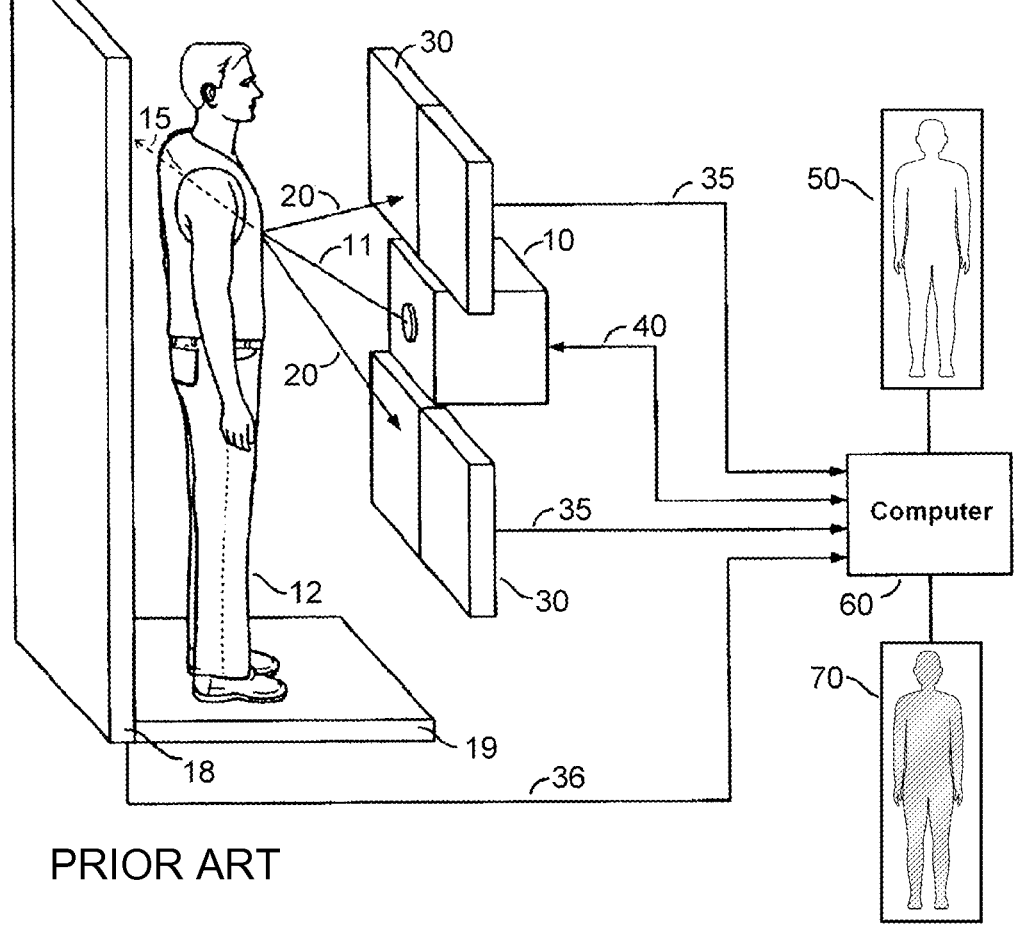
FIG. 1 is a depiction of the prior art.
Figure 2:
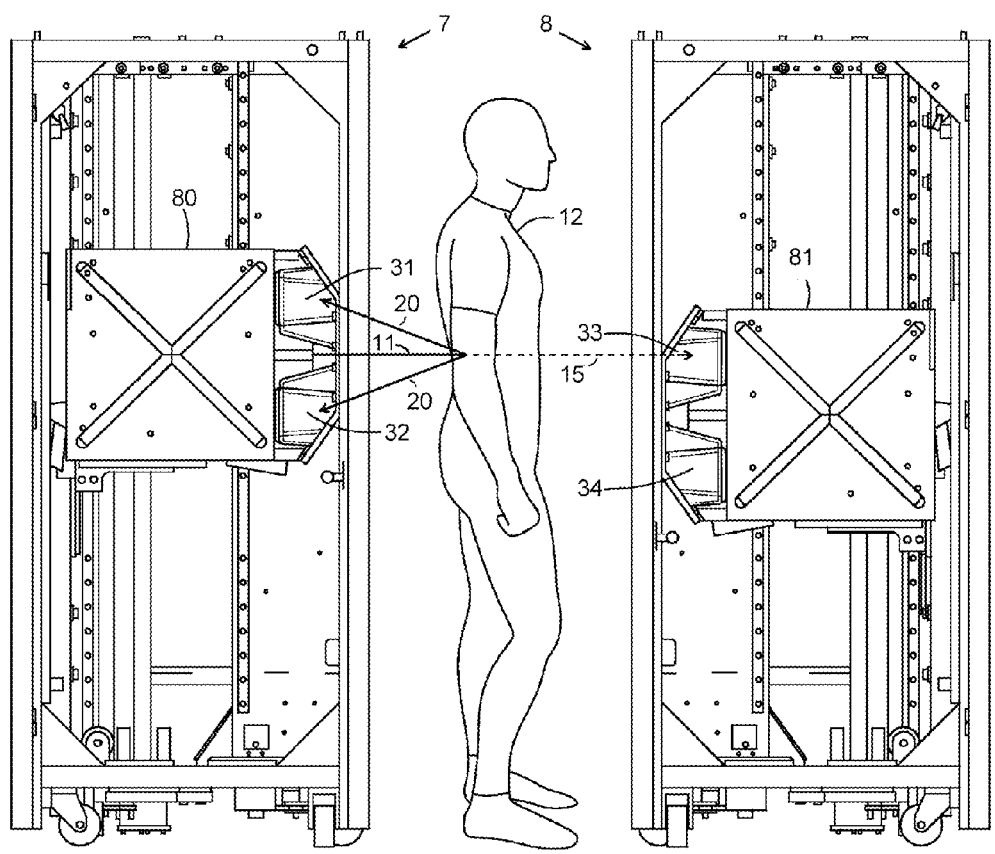
FIG. 2 is a depiction of the prior art.

FIG. 4A depicts an important advantage of the present Invention over the prior art: a comprehensive inspection of the shoes of the examined person 12. This is critically important since the shoes are a common hiding place for weapons, explosives, contraband, and the like. The preferred embodiment of the present Invention provides images of the feet within all four of the main body images: front-backscatter 370, front-transmission 380, rear-backscatter 470, and rear transmission 480. However, the inspection of the shoes in these images may not be adequate for all security inspection applications, for the same reasons described for the prior art configuration depicted in FIG. 1. A significant advantage of one embodiment of the present Invention is the inclusion of a dedicated scanner to examine the shoes for concealed objects. Base-backscatter image 270 is obtained from beneath the shoes, thereby detecting security threats hidden underneath the foot, in the soles of the shoes, and in the heals of the shoes. Further, because of the close proximity of the base x-ray source 210 to the shoes, the cross section of the base x-ray beam 201 is only about 1.5 mm×1.5 mm where it intersects the shoes. This results in a 1.5 mm spacial resolution in both the base backscatter image 270 and the base transmission image 280. This factor of four improvement in spacial resolution, compared to any of the images in the prior art, enables discrimination between the bones in the feet and concealed objects in the shoes. That is, the close placement of the base x-ray source to the shoes overcomes the inadequacies of the prior art.

FIG. 5 depicts the characteristics of the front and rear transmission images 380 480. The transmission background 555 corresponds to the region around the examined person 12 where no objects exist in the imaging area. In this region the x-ray beams 301 401 propagate unaffected from the x-ray sources 310 410 to the x-ray detectors, 420 320, respectively. The presence of this region in the transmission images 380 480 is important because it informs the security officer inspecting the image that no security threats reside in this area. As known in the art, this information cannot always be obtained from the backscatter images 370 470 due to an ambiguity related to the physics of backscatter x-rays. In particular, this area around the body in backscatter images 370 470 appears black because there is no material to scatter the x-rays. Likewise, metal objects appear black in backscatter images 370 470 because the high atomic number material strongly absorbs x-rays by the photoelectric effect. This results in both metal and the background appearing black, with little or no ability to discriminate between the two. However, the background 555 of the transmission images 380 480 has no such ambiguity, and allows full detection of metal objects.

The region representing the examined person 12 in the transmission images 380 480 can be divided into two sections. The first consists of areas on the body where the x-ray beams 301 401 encounter less than a few inches of tissue on their path through the body of the examined person 12. This includes the feet 551, the forearms 552, and about one-half inch around the periphery of the body 553. The second is those areas on the body where the x-ray beams 301 401 encounter more than a few inches of tissue on their path through the body, that is, highly attenuated areas 550. As known in the art, the signal-to-noise ratio of a transmitted x-ray beam is greatly diminished when the beam becomes highly attenuated. Unlike medical radiography where the allowable incident radiation levels are quite high, body scanners must use a minuscule level of radiation for the upmost safety. Therefore, even though the x-ray beams 301 401 do penetrate the highly attenuated areas 550 to some extent, the signal-to-noise ratio of the respective detected signals is too low to create a usable image. This results in the highly attenuated areas 550 of the transmission images being of little use for detecting concealed objects. However, this is of little consequence, since this is exactly the region where the backscatter images 370 470 excel in concealed object detection. This illustrates a fundamental strategy and advantage of the present Invention: images are acquired from up to three views with two modalities such that the relative limitations of any one image are overlapped and overcome by the relative strengths of another image. As known in the art, the dividing line between the highly attenuated areas 550 and the remainder of the image is not abrupt, but gradual in nature.

The distinctness of the border depicted in FIG. 5 is for explanatory purposes only, and those skilled in the art of x-ray imaging clearly understand the nature of this transition.

In comparison, the feet 551, the forearms 552, and the periphery of the body 553 are regions of the body where backscatter images 370 470 often fail to detect concealed objects. This failure occurs for a variety of reason. One reason is the ambiguity between background and metal previously discussed, since the periphery of the body 553 is adjacent to the transmission background 555. Another reason is that small objects can be concealed in the closed hands, under the soles of the feet, or within the structure of the shoes. Still another reason is the ability to conceal objects in an arm pit or between the arm and the side of the body. In all of these cases the concealed object is hidden from backscatter inspection by an inch or two of overlaying body tissue. In summary, the transmission images 380 480 excel at detection of concealed security threats in the transmission background 555, the hands and forearms 552, and the periphery of the body 553. On the other hand, the transmission images provide little or no detection capability in the highly attenuated areas 550, and only partial capability in the shoes and feet 551. In comparison, the backscatter images provide excellent detection in the highly attenuated areas 555, but generally poor detection everywhere else. Lastly, the base transmission image 280 and the base backscatter image 270 close the remaining gap in detection, providing high resolutions images of the feet and shoes.

Figure 6A:
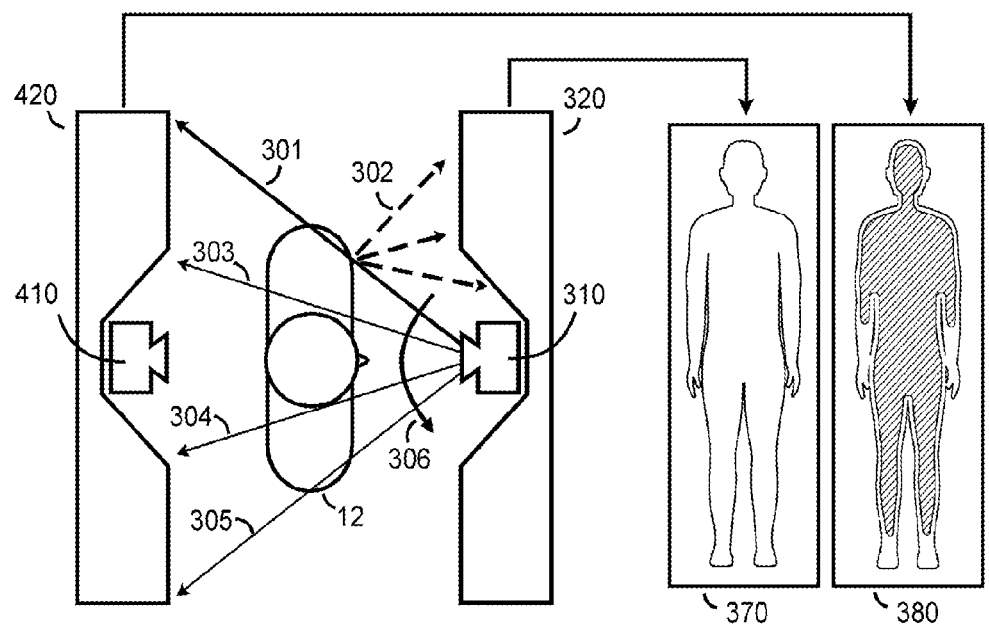
FIG. 6A and FIG. 6B are depictions in accordance with the operation of the present invention.
Figure 6B:
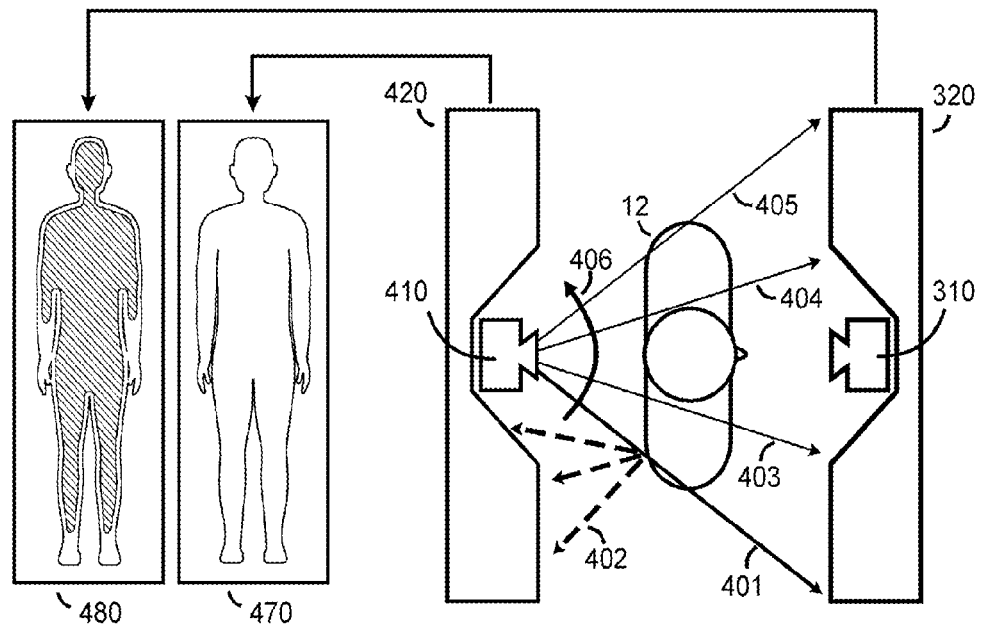

FIG. 6A and FIG. 6B depict top views of one preferred embodiment of the present Invention. As previously described, prior art body scanners have their x-ray sources located between and/or behind their detectors. In contrast, one preferred embodiment of the present Invention employs a unique positioning of x-ray sources and detectors to achieve a number of advantages. As depicted in FIG. 6A and FIG. 6B, this unique positioning involves five objects, the examined person 12, the front x-ray source 310, the rear x-ray source 410, the front x-ray detector 320, and the rear x-ray detector 420. The front x-ray source 310 and the rear x-ray source 410 being jointly referred to as the x-ray source pair 310 410. Likewise, the front x-ray detector 320 and the rear x-ray detector 420 are referred to jointly as the x-ray detector pair 320 420. The unique positioning being the x-ray source pair 310 410 being horizontally located between the x-ray detector pair 320 420, and the examined person 12 being horizontally located between the x-ray source pair 310 410. Described in other words, the location of the five objects, in order from the posterior to the anterior sides of the examined person 12, are: rear x-ray detector 420, rear x-ray source 410, examined person 12, front x-ray source 310, and the front x-ray detector 320.

In one preferred embodiment, as depicted in FIG. 6A and FIG. 6B, the x-ray detectors 320 420 are wider on the sides of the x-ray sources 310 410, and become narrower behind them. In another preferred embodiment the detectors 320 420 are the same width their entire length, essentially the same width as depicted in FIG. 6A and FIG. 6B behind the x-ray sources 310 410. The distinction in these two cases being the particular internal construction of the x-ray detectors 320 420. For instance, as known in the art, x-ray detectors can be formed from a light tight enclosure lined with fluorescent screens, with large diameter photomultiplier tubes mounted on the interior. The wider part of the x-ray detectors 320 420, as shown in FIG. 6A and FIG. 6B, are useful to enclose the photomultiplier tubes in this particular detector construction. Alternatively, as known in the prior art, x-ray detectors 320 420 can be constructed from sheets of plastic scintillator with smaller diameter photomultiplers mounted on the ends. In this construction the x-ray detectors 320 420 are a uniform width as needed to house the plastic scintilator sheet, typically a few inches. The important point being that the x-ray detectors 320 420 extend behind, i.e., outside of, the x-ray sources 310 410, as depicted in FIG. 6A and FIG. 6B.

The front scanning cycle 610 of the preferred embodiment is further explained in FIG. 6A. X-ray source 310 emits a front x-ray beam 301, in the direction of the examined person 12. Interaction of the front x-ray beam 301 with the body of the examined person 12 results in front-backscattered x-rays 302, which are detected by front x-ray detector 320. The portion of the front x-ray beam 301 that is transmitted through the examined person 12 is detected by rear x-ray detector 420. During the front scanning cycle 610, the front x-ray beam 301 is repeatedly swept in an arc 306, as depicted by the front x-ray beam 301 successively moving to a second position 303, a third position 304 and a fourth position 305. As known in the art, this beam sweeping motion provides the horizontal component of the flying spot raster scan. During the front scanning cycle 610, x-ray source 310 moves from a lowermost position to an uppermost position, thereby providing the vertical component of the flying spot raster scan. The information from the front x-ray detector 320 and the rear x-ray detector 420 is used to create the front-backscatter image 370 and the front-transmission image 380, respectively. In one preferred embodiment, during the front scanning cycle 610 the rear x-ray source 410 is positioned above the head of the examined person 12, thereby placing it out of the field-of-view of the front backscatter image and the rear backscatter image. In this manner the front scanned images have a complete field of view with no missing regions.

As depicted in FIG. 6B, the rear scanning cycle 620 is carried out in a mirror image fashion to that of the front scanning cycle 610. The rear x-ray source 410 emits a rear x-ray beam 401 that sweeps in an arc 406 as represented by a second position 403, a third position 404 and fourth position 405. The rear-backscatter x-rays 402 are detected by rear x-ray detector 420, and the information used to create rear-backscatter image 470. The portion of the rear x-ray beam 401 that is transmitted through the examined person is detected by front x-ray detector 320, and the information is used to create the rear-transmission image 480. As previously described, the sweeping motion of the rear x-ray beam provides the horizontal component of the raster scan of the flying spot, and the vertical motion of the rear x-ray source 410 provides the vertical component. As generally explained above, in one preferred embodiment the front x-ray source 310 is located above the head of the examined subject 12 during the rear scanning cycle 620, thereby allowing the rear transmission image 480 and the rear backscatter image 470 to have a complete field-of-view.

The unique positioning of the x-ray sources 310 410, x-ray detectors 320 420, and the examined person 12, depicted in FIG. 6A and FIG. 6B, has numerous advantages over the prior art. First, the apparatus is extremely compact, with a front-to-back width of only about five feet, compared with approximately nine feet in the prior art. This width reduction allows the present Invention to be used in security checkpoints with limited floor space, whereas the prior art body scanners simply would not fit. Second, it enables scanning of both the anterior and posterior sides of a stationary person, while obtaining a complete field-of-view on both the backscatter and transmission images. As previously discussed, prior art systems are unable to achieve both of these advantages in a single embodiment. Third, the overall placement of the components facilitates the incorporation of a base assembly 200, containing a shoe scanner.

Figure 7:
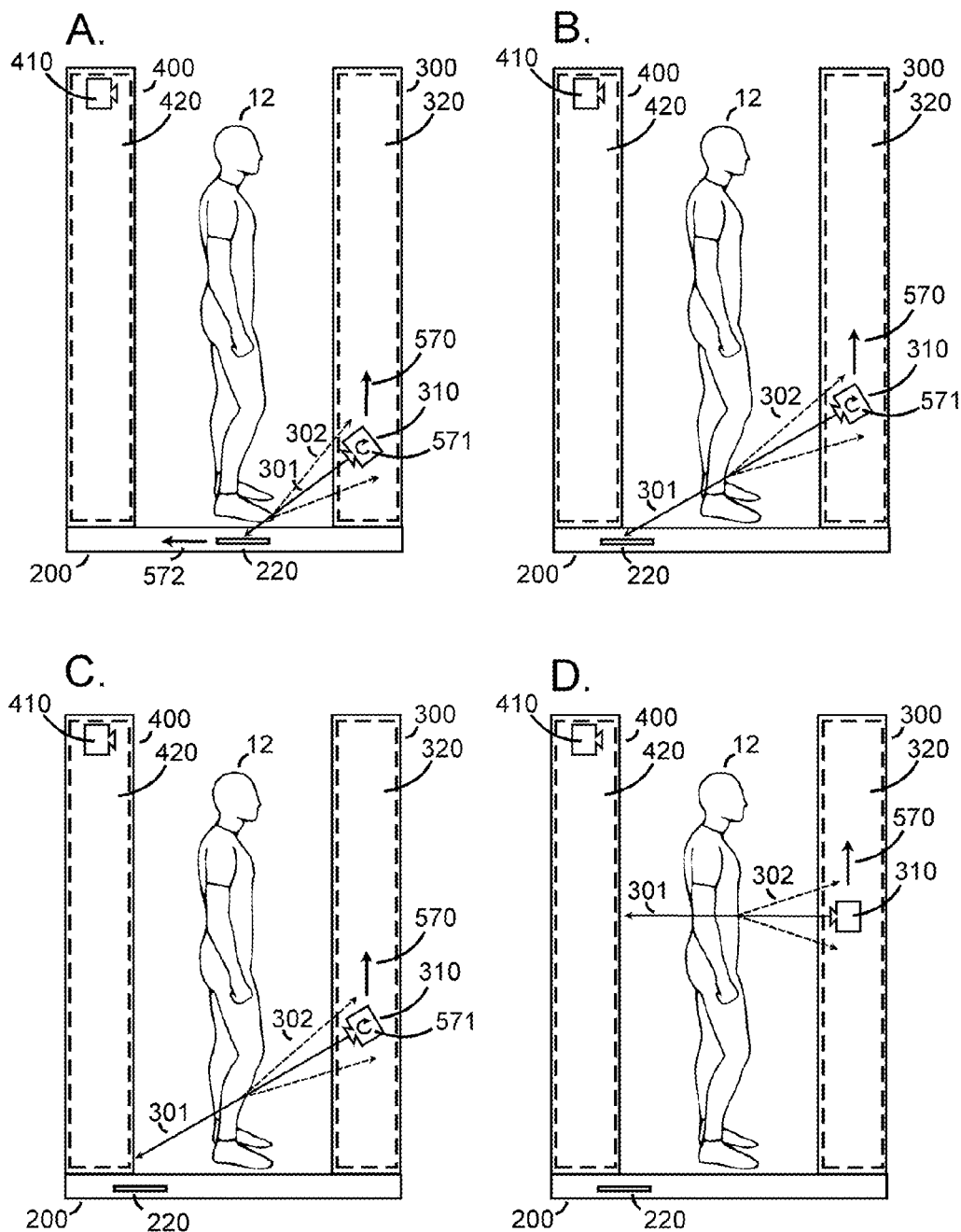
FIG. 7A, FIG. 7B, FIG. 7C, and FIG. 7D are depictions in accordance with the operation of the present invention.

FIGS. 7A-D further explain the operation of one preferred embodiment of the present Invention. FIG. 7A depicts the location of the front x-ray source 310 at the initiation of the front scanning cycle 610. The front x-ray source 310 is at its lowermost position within the front assembly 300, with a rotation 571 that directs the front x-ray beam 301 downward at an approximate 45 degree angle with respect to the vertical. At this initial location, the portion of the front x-ray beam 301 that passes through the feet and shoes of the examined person 12 is detected by the base detector 220. As the front scanning cycle proceeds, as depicted in FIG. 7B, the front x-ray source 310 moves upward 570 and rotates 571, while the base detector 220 move horizontally 572. These motions 570 571 572 are synchronized such that the front x-ray beam 301 is continually detected by the base detector 220. FIG. 7C depicts that the detection of the front x-ray beam 301 is transferred from base detector 220 to rear detector 420 during the scanning cycle 610. FIG. 7D depicts the location of the front x-ray source 310 at a time later in the front scanning cycle 610, where the rotation 571 has place the front x-ray beam 301 essentially horizontal. For the remainder of the front scanning cycle 610 the front x-ray beam 301 remains essentially horizontal. In one preferred embodiment shown in FIG. 7 A-D, during the course of the front scanning cycle 610 the rear x-ray source 410 is positioned above the head of the examined person 12, such that it does not interfere with the front transmission image 380 or the front backscatter image 370. During the subsequent rear scanning cycle 620, the operations described for the front scanning cycle 610 are duplicated in a mirror image fashion.

Figure 8:
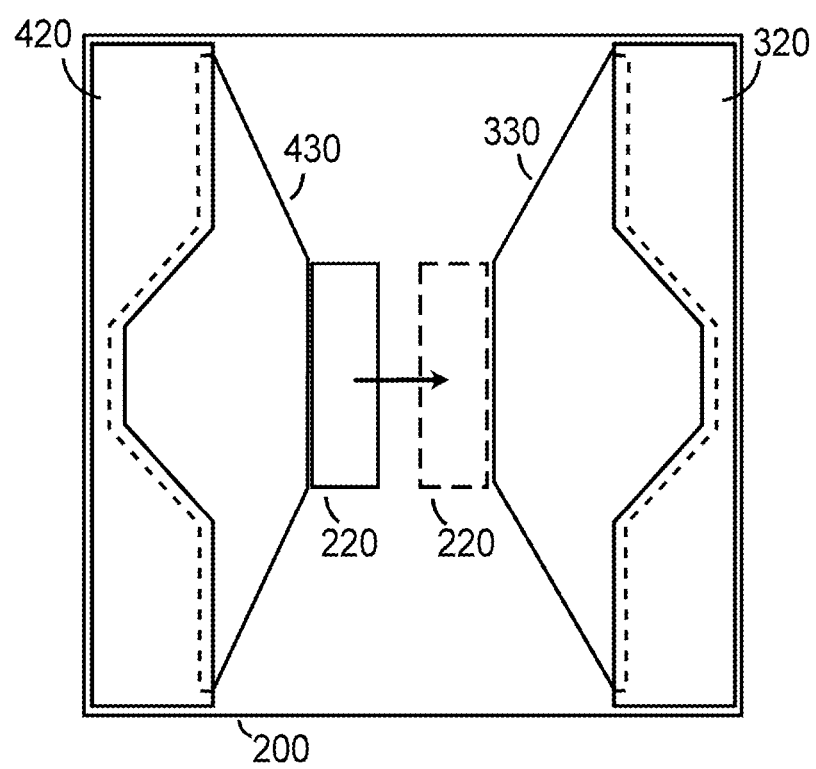
FIG. 8 is a depiction in accordance with one aspect of the present invention.

FIG. 8 depicts a top view of another embodiment of the present Invention. The base detector 220 moves a shorter distance in this embodiment, about 14 inches, being just long enough to acquire a base-backscatter image 270 and a base-transmission image 280 of the shoes. A base rear detector 430 is mounted within the base assembly 200 between the most rearward position of the base detector 220 and the rear detector 420. Acting together, these three detectors 420 430 220 detect the complete field-of-view for the front transmission image 380. Likewise, a base front detector 330 is provided to obtain a complete rear transmission image 480, acting in conjunction with the base x-ray detector 220 and the front x-ray detector 320.

Figure 9:
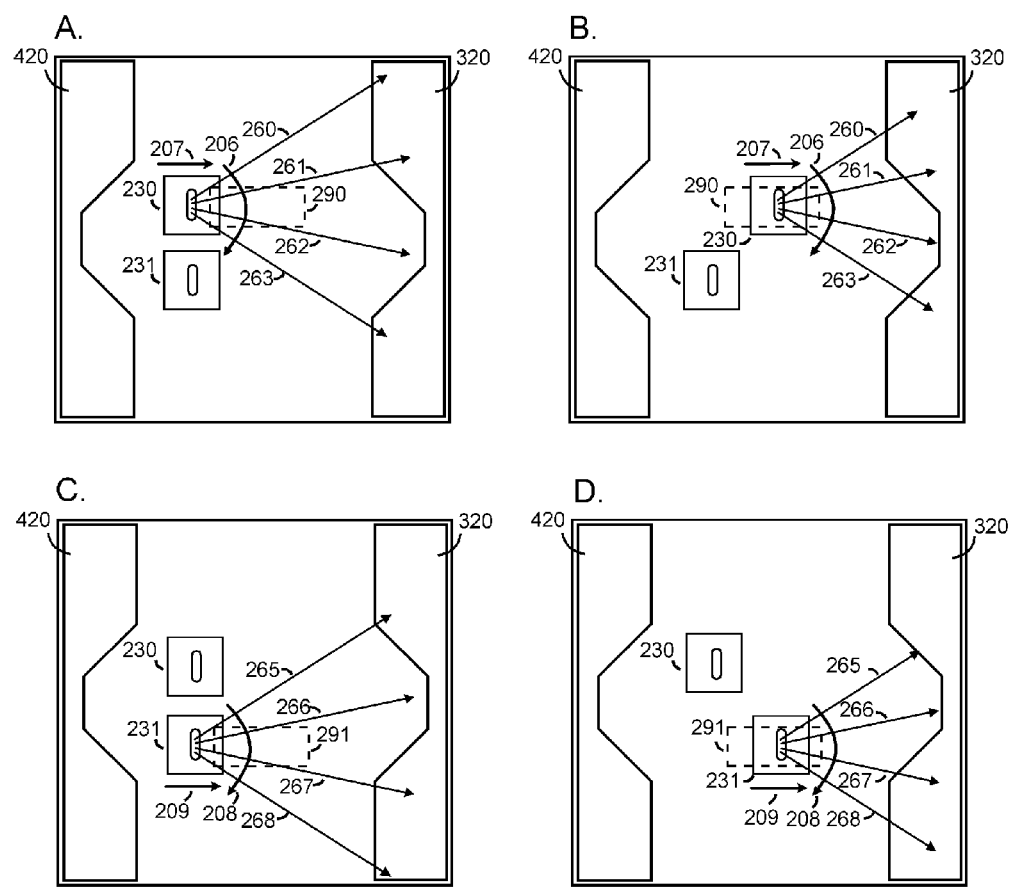
FIG. 9A, FIG. 9B, FIG. 9C, and FIG. 9D are depictions in accordance with one aspect of the present Invention.

FIG. 9 A-D depicts another preferred embodiment where two shoe scanners are provided, one for each of the two shoes worn by the examined person 12. The base scanning cycle 630 of this embodiment begins with both the left shoe x-ray source 230 and the right shoe x-ray source 231 in the rear position, as depicted in FIG. 9A. The left shoe x-ray source 230 emits a left shoe x-ray beam 260 upward in the same geometry as previously described in FIG. 4 for base x-ray source 210 and base x-ray beam 210. In accordance with the flying spot technique previously described, the left shoe x-ray beam is repeatedly swept in an arc 206, depicted by a second position 261, a third position 262, and a fourth position 263 of the x-ray beam 260. Left shoe x-ray source 230 is simultaneously moved horizontally 207, as depicted in FIG. 9B, thereby mapping out a left shoe field-of-view 290. In the second portion of the base scanning cycle 630, as depicted in FIG. 9C and FIG. 9D, the right x-ray source repeats this process. That is, the right shoe x-ray beam 265 is swept in an arc depicted by second 266, third 267 and fourth positions 268, while the right shoe x-ray source 231 is moved 209 from back to front thereby defining a right shoe field-of-view 291. During both the left and right portions of the base scanning cycle 630, the front detector 320 detects transmitted x-rays and the base detector 220 detects backscatter x-rays as previously described.

Figure 10:
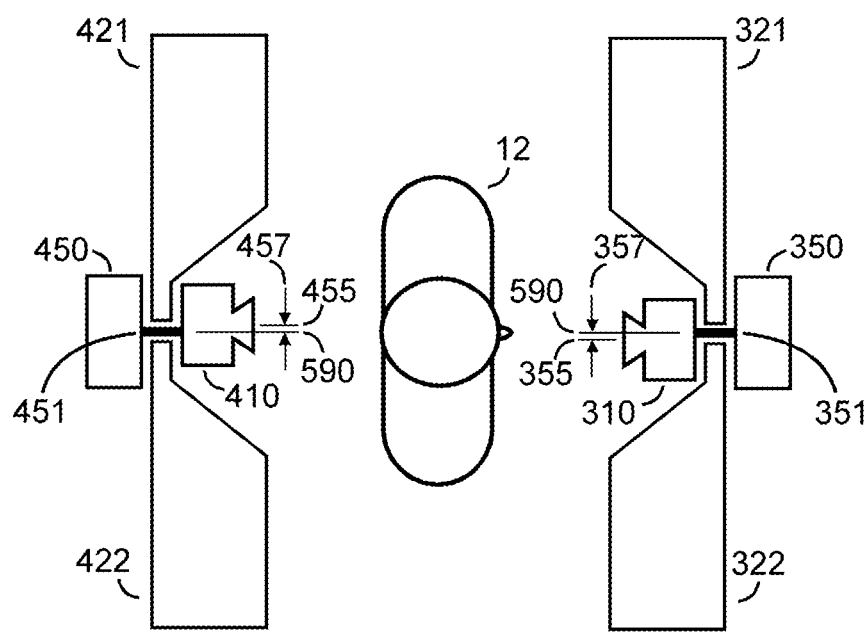
FIG. 10 is a depiction in accordance with one aspect of the present invention.

FIG. 10 depicts another preferred embodiment of the present Invention. Front detector 320 comprises a front-left detector 321 and a front-right detector 322. Likewise, rear detector 420 comprises a rear-left detector 421 and a rear-right detector 422. A front connecting member 351 rigidly connects the front x-ray source 310 with a front vertical motion actuator 350. Likewise, a rear connecting member 451 rigidly connects the rear x-ray source 410 with a rear vertical motion actuator 450. X-ray sources used in the art typically weight about 30 pounds, requiring the front and rear connecting members 351 451 to preferably be steel or aluminum bars of about 0.25" thickness. Therefore, the gap between the front-left detector 321 and the front-right detector 322, and the gap between the rear-left detector 421 and the rear-right detector 422, is preferably about 0.75", providing sufficient clearance for the vertical movement of the components. That is, the front vertical motion actuator 350 provides support and vertical motion to the front x-ray source 310 through front connecting member 351. Likewise, the rear vertical motion actuator 450 provides support and vertical motion to the rear x-ray source 410 through rear connecting member 451. In this embodiment, the front beam emission centerline 355 has a front horizontal offset 357 from the examined person centerline 590, by about 0.5 inches. Likewise, the rear beam emission centerline 455 has a rear horizontal offset 457 from the examined person centerline 590, by about 0.5 inches. That is, the front image acquisition is shifted about 0.5 inches to the examined person's right, while the rear image acquisition is shifted about 0.5 inches to the examined person's left.

Figure 11:
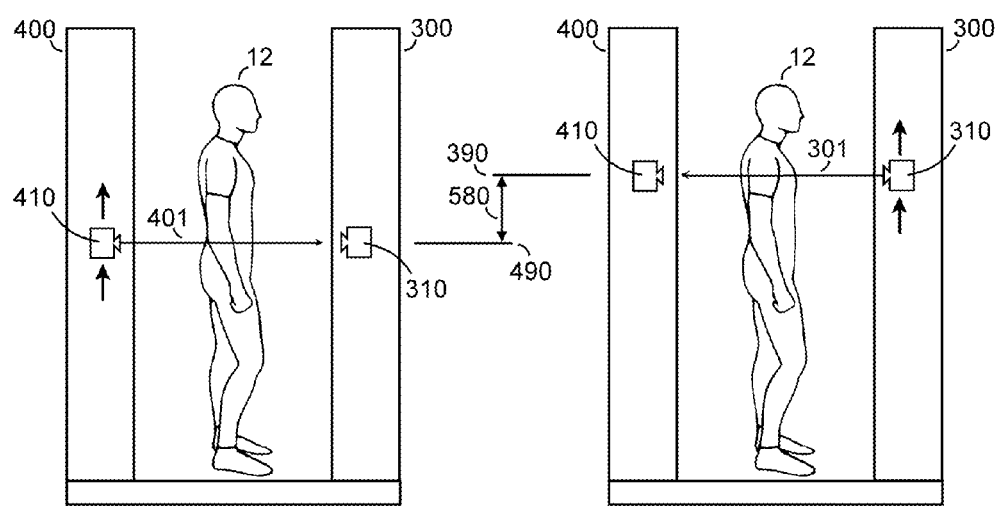
FIG. 11 is a depiction in accordance with one aspect of the present invention.

FIG. 11 depicts another aspect of this preferred embodiment. During the front scanning cycle 610, depicted in the right half of FIG. 11, the front x-ray source 310 moves upward in the front assembly 300, as previously described. In this embodiment, the rear x-ray source 410 is positioned vertically such that there is a first controlled vertical height 390 where the front x-ray beam 301 passes the rear x-ray source 410. Likewise, during the rear scanning cycle 620, depicted in the left half of FIG. 11, the front x-ray source 310 is positioned vertically such that there is second controlled vertical height 490 where the rear x-ray beam 401 passes the front x-ray source 310. The vertical distance between the first and second controlled vertical heights 390 490 being a vertical scanning offset 580.

Figure 12:
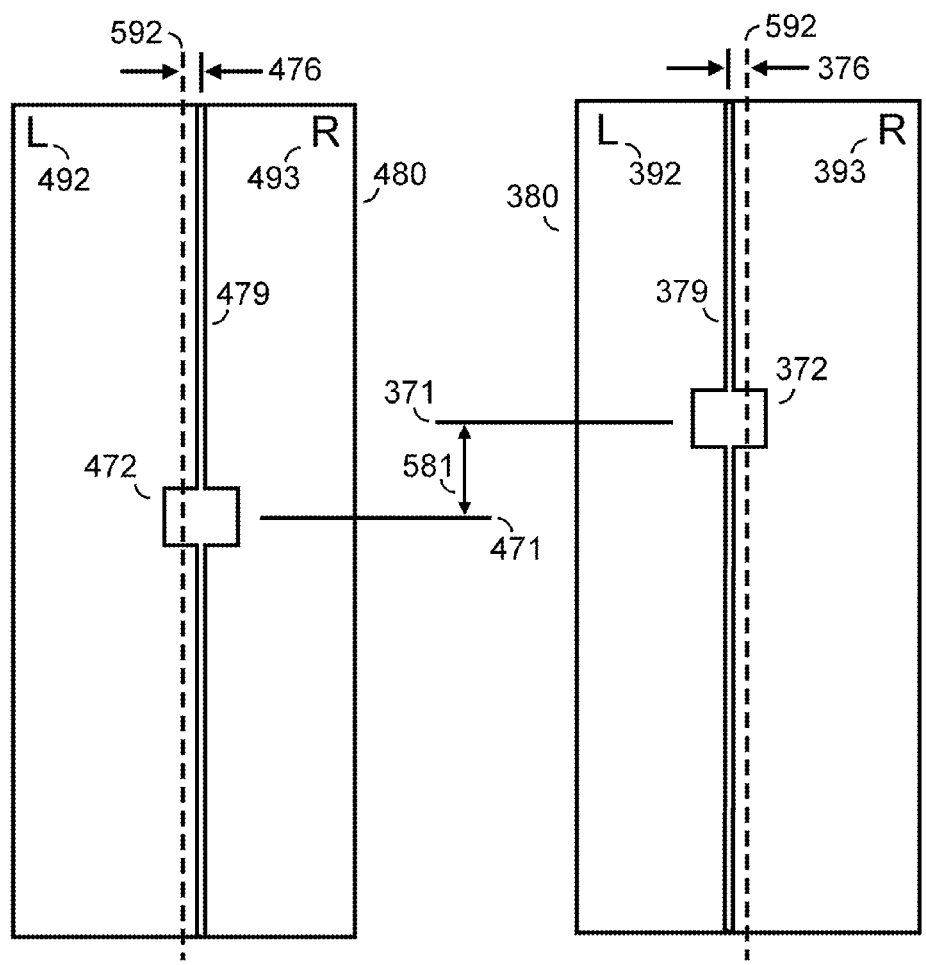
FIG. 12 is a depiction in accordance with one aspect of the present invention.

FIG. 12 depicts the purpose and advantage of the described vertical and horizontal offsets. The right half of FIG. 12 depicts the front-transmission image 380 while the left half shows the rear-transmission image 480. The gap between rear-left detector 421 and rear-right detector 422 appears in the front transmission image 380 as a front-blind-vertical-region 379, where no image information has been obtained. Likewise, the gap between front-left detector 321 and front-right detector 322 appears in the rear transmission image 480 as a rear-blind-vertical-region 479, where no image information has been obtained. For positional reference, the examined person's centerline 590 appears in the transmission images 380 480 at the centerline-imaged-position 592. The left side of the examined person 12 appears in the transmission images 380 480 as denoted by the upper case "L" 392 492, and the right side by the upper case "R" 393 493, respectively. In the front transmission image 380, the front horizontal offset 357 causes the front-blind-vertical-region 379 to be offset 376 from the centerline-imaged-position 592. Likewise, in the rear transmission image 480, the rear horizontal offset 457 causes the rear-blind-vertical-region 479 to be offset 476 from the centerline-imaged-position 592. That is, the horizontal offsets 357 457 in the imaging apparatus result in corresponding offsets 376 476 in the images 380 480, respectively. However, the offsets 376 476 in these two image 380 480 occur in opposite directions from the centerline-imaged-position 592. That is, one is to the examined person's left 392 492, and one to the examined person's right 393 493. In a front transmission image 380, the rear x-ray source 410 appears as a first blind area 372 at a first image height 371 that corresponds to the first controlled vertical height 390. Likewise, in the rear transmission image 480, the front x-ray source 310 appears as a second blind area 472 at a second image height 471 that corresponds to the second controlled vertical height 490.

The horizontal vertical offset 581 being the difference between these two, and corresponding to the vertical scanning offset 580.

Near the horizontal center of the transmitted images 380 480, the front x-ray beam 301 and the rear x-ray beam 401 transverse approximately the same path through the imaging area, but in opposite directions. Therefore, the front and rear transmitted images 380 480 contain essentially the same information near their horizontal centers. As depicted in FIG. 12, the blind areas 372 379 of the front transmission image 380 occupy a different region than the blind areas 472 479 of the rear transmission image. Therefore, the combination of the two transmission images 380 480 contains full and complete information, just as if the blind areas 372 379 472 479 did not exist. In other words, this embodiment of the present Invention provides for small gaps between the detectors, and also provides for the non-imaging x-ray source to be within the field-of-view, while still obtaining full and complete transmission image information.

Although particular embodiments of the Invention have been described in detail for the purpose of illustration, various other modifications may be made without departing from the spirit and scope of the present Invention. The radiant energy emission, typified by they use of x-rays, may be other forms of radiant energy, such a gamma rays, millimeter waves, terahertz waves, charged and uncharged particles, acoustic waves, and so on. The detectors may be constructed with scintillator materials and light detectors; ionization chambers; solid state devices such as germanium and cadmium zinc telluride; and other detector technologies known in the art. Generation of the flying spot beam may be accomplished by rotating disks or drums, other forms of movable apertures, moving focal spot x-ray tubes, or other methods of controlling radiant energy known to those skilled in the art. The front, rear and base scanning cycles may be conducted in different sequential orders. Acquisition and manipulation of the various electronic images is in accordance with the broad fields of analog electronics, digital electronics, and digital image processing, with many known techniques and methods that one skilled in the art will recognize as being within the spirit and scope of the present Invention.

I claim:

1. A human scanner comprising:
   a. a front assembly comprising:
      i. a stationary front detector; and
      ii. a front source for generating x-rays to the human to receive back-scatter radiation by the stationary front detector;
   b. a rear assembly comprising:
      i. a stationary rear detector; and
      ii. a rear source for generating x-rays to the human to receive back-scatter radiation by the stationary rear detector; and
   wherein the front source is positioned in front of the stationary front detector and the rear source is positioned in front of the stationary rear detector, wherein the front source and the rear source are configured to emit radiant energy toward the human, wherein the front source is configured to move vertically within the front assembly and the rear source is configured to move vertically within the rear assembly, wherein the front source is horizontally aligned with the stationary front detector, and wherein the rear source is horizontally aligned with the stationary rear detector.

2. The human scanner of claim 1, wherein the radiant energy is x-rays.

3. The human scanner of claim 2, wherein the stationary front detector comprises a left front detector and a right front detector; and the stationary rear detector comprises a left rear detector and a right rear detector.

4. The human scanner of claim 3, further comprising:
   a. a front source supporting member, the front source supporting member positioned between the left front detector and the right front detector;
   b. a rear source supporting member, the rear source supporting member positioned between the left rear detector and the right rear detector.

5. The human scanner of claim 2, further comprising a digital computer configured to create digital x-ray images comprising:
   a. a front backscatter image;
   b. a rear backscatter image;
   c. a front transmission image;
   d. and a rear transmission image.

6. The human scanner of claim 5, wherein the front transmission image is spatially offset with respect to the rear transmission image.

7. The human scanner of claim 6, wherein the spatial offset corresponds to a horizontal offset.

8. The human scanner of claim 6, wherein the spatial offset comprises a vertical offset asymmetry in a location of the front source when the rear source is energized and the rear source when the front source is energized.

9. The human scanner of claim 1, further comprising a digital computer configured to create digital x-ray images, the digital x-ray images comprising: a front backscatter image, a rear backscatter image, a front transmission image and a rear transmission image.

10. The human scanner of claim 1, wherein the front detector and the rear detector are configured to detect radiant energy passing through, and reflecting off of, the human.

11. The human scanner of claim 1, further comprising:
   a. a base comprising:
      i. a base detector; and
         a base source for generating x-rays to the human to receive back-scatter radiation by the base detector.

* * * * *